United States Patent
Rothman et al.

(10) Patent No.: US 7,987,458 B2
(45) Date of Patent: Jul. 26, 2011

(54) METHOD AND SYSTEM FOR FIRMWARE IMAGE SIZE REDUCTION

(75) Inventors: Michael A. Rothman, Puyallup, WA (US); Vincent J. Zimmer, Federal Way, WA (US); Andrew J. Fish, Olympia, WA (US); Penny Gao, Shanghai (CN); Bin Xing, Changning District (CN)

(73) Assignee: Intel Corporation, Santa Clara, CA (US)

( * ) Notice: Subject to any disclaimer, the term of this patent is extended or adjusted under 35 U.S.C. 154(b) by 1309 days.

(21) Appl. No.: 11/523,943

(22) Filed: Sep. 20, 2006

(65) Prior Publication Data
US 2008/0072211 A1 Mar. 20, 2008

(51) Int. Cl.
*G06F 9/45* (2006.01)
(52) U.S. Cl. .................... 717/151; 717/140; 717/159
(58) Field of Classification Search .................... None
See application file for complete search history.

(56) References Cited

U.S. PATENT DOCUMENTS

2005/0071616 A1* 3/2005 Zimmer et al. ............ 713/1
2005/0160159 A1* 7/2005 Zimmer et al. ............ 709/223
2005/0188368 A1* 8/2005 Kinney ...................... 717/174

OTHER PUBLICATIONS ecma international, "Common Language Infrastructure (CLI) - Partitions I to VI", Jun. 2006, Standard ECMA-335, 4th Edition pp. 1-556.*

* cited by examiner

*Primary Examiner* — Michael J Yigdall
*Assistant Examiner* — Ben C Wang
(74) *Attorney, Agent, or Firm* — Blakely, Sokoloff, Taylor & Zafman LLP

(57) ABSTRACT

Embodiments described herein disclose the use of a compiler pre-processing component for the optimization of a firmware image so that it can be made to take up less space in a memory device without the use of compression. Embodiments identify repeated modules or common components across previously separate binary firmware modules within a body of software and automatically and seamlessly merge the content of these modules so they occupy less space in their binary form. The overhead footprint of the binary is reduced without modifying the pre-existing source code defining the individual components. In general, the resulting space savings is additive to the savings provided by existing compression savings techniques.

13 Claims, 5 Drawing Sheets

METHOD AND SYSTEM FOR FIRMWARE IMAGE SIZE REDUCTION

BACKGROUND

Embodiments are in the field of computer programs, and particularly in the field of compilers for seamlessly reducing the image size of firmware components.

The development and incorporation of extensive and complicated firmware programs in present computer platforms has led to increases in storage size requirements. Typically, firmware, such as BIOS (basic input/output system) code, diagnostic routines, embedded applications, and the like are stored in relatively expensive memory devices, such as Flash memory. Space in Flash devices, and other similar memory devices is typically at a premium because such memory is usually used in energy and/or space critical applications in which much code is stored in a relatively small amount of memory. With the constant downward pressure in the price of computer and embedded system platforms, it is important to reduce the costs associated with the construction of platforms. Reducing the firmware footprint helps to reduce the bill-of-materials cost associated with FLASH and other memory parts, which are critical components of the platform.

In order to optimize the memory usage, reducing the size of the binary (object code) of the firmware is critical. Various methods exist to reduce the size of program code, such as compression, and similar techniques. Compression methods typically take advantage of identical lines of code, and represent these portions of code in a different, and usually smaller, format. This method requires the addition of separate compression and decompression algorithms to encode the original program into a smaller format, and then decode the compressed program for proper execution. Compression methods can thus add significant processing overhead to the firmware build and execution stages. In general, compression is best suited to lengthy programs written in a high-level language. It is not particularly well-suited to all low-level, hardware specific code such as firmware. For example, certain types of code, such as execute-in-place (XIP) code cannot be compressed due to structural inherencies in the code. Such code is typically used for sensitive applications, such as firmware or embedded applications. Compression is also generally not effective in program code where entire modules or subroutines are used in a plurality of different places, or where redundant modules or lines of code are separated from each other by a relatively great distance in the program.

DETAILED DESCRIPTION

Embodiments described herein disclose the use of a compiler pre-processing component for the optimization of a firmware image so that it can be made to take up much less space in a memory device without the use of compression. Embodiments identify repeated modules or common components across previously separate binary firmware modules within a body of software and automatically and seamlessly merge the content of these modules so that they occupy less space in their binary form. The overhead footprint of the binary is reduced without modifying the pre-existing source code. In general, the resulting space savings is additive to the savings provided by existing compression techniques.

Figure 1:
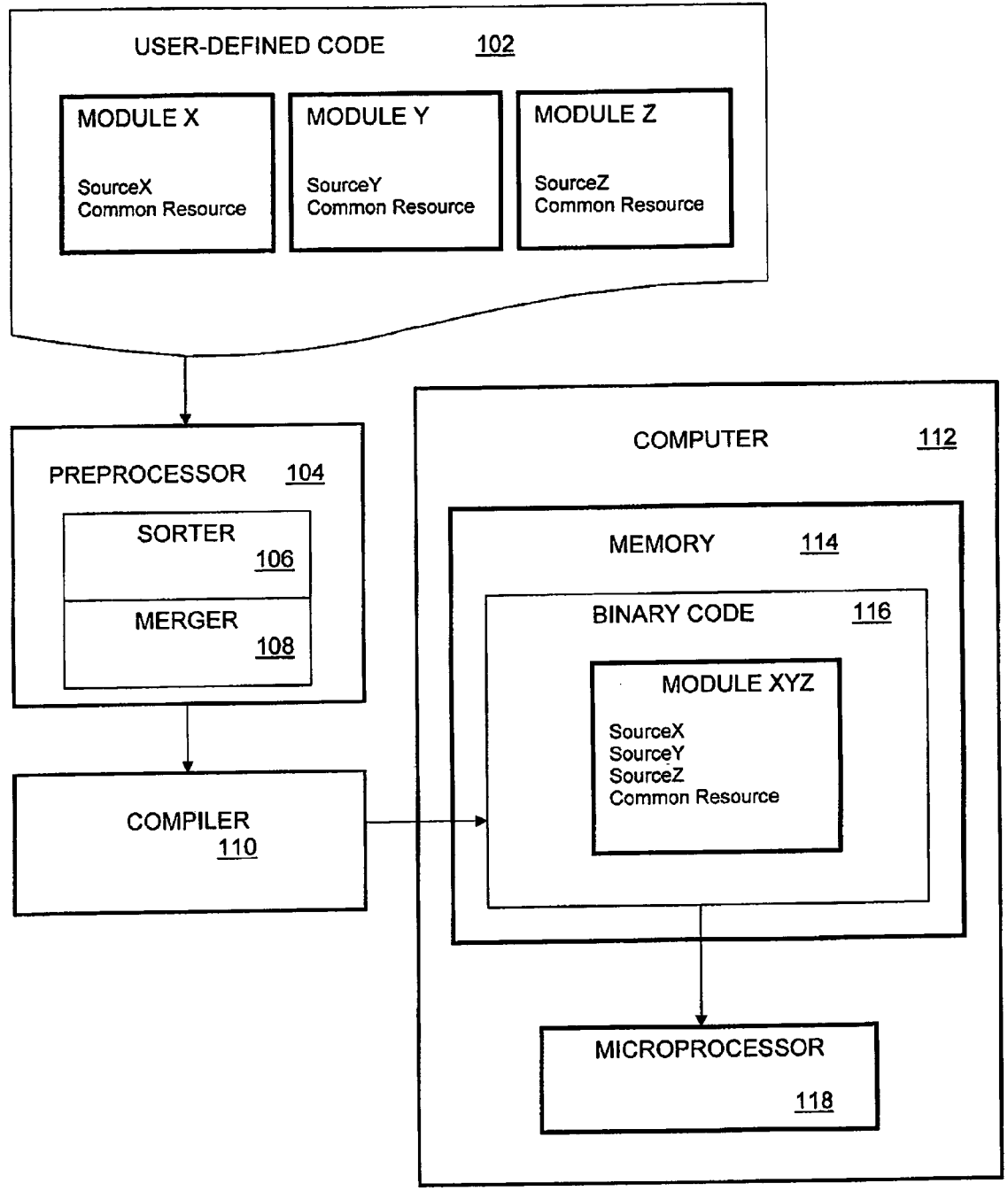
FIG. 1 is a block diagram of a compiler preprocessing system for generating reduced footprint firmware binary code for execution on a computer, according to an embodiment.

Aspects of the one or more embodiments described herein may be implemented on a computer, or computers executing software instructions. The computer may be a standalone computer, or it may be networked in a client-server arrangement or similar distributed computer network. The computer is generally configured to execute object code (binary code) generated by a compiler or code generator modules that transform high level source code into executable object code. FIG. 1 is a block diagram of a compiler preprocessing system for generating reduced footprint firmware binary code for execution on a computer, according to an embodiment.

The computer 112 of FIG. 1 represents a portion of a computer that includes at least one microprocessor 118 and a memory 114. Computer 112 may be embodied on one or more motherboards, or integrated circuit devices comprising at least some other components of the computer, not shown. For example, computer 112 may include a memory controller, an interface controller, a bus coupling the components of the computer, as well as a number of buffers and similar circuitry for coupling the computer directly or indirectly to one or more on-board or off-board peripheral devices or networks.

In FIG. 1, user defined code 102 representing a program or a portion of a program written in a high-level computer program such as the C programming language, the FORTRAN programming language, the Java™ programming language, and so on, is transformed into one or more executable modules through a compiler 110. Compiler 110 generally represents a computer program, set of programs, or logic circuitry that is configured to transform high level source code into executable binary code. The compiler 110 of FIG. 1 may include subcomponents, not shown, such as a parser, semantic analyzer, optimizer, code generator, and other components. The compiler 110 generates binary code 116 that is generally stored in a memory of the computer system 112, such as random access memory (RAM) 114, or similar memory. For applications in which the code represents firmware, memory 114 may be Flash memory. The binary code 116 can comprise one or more executable threads that are executed in microprocessor 118.

For the embodiment illustrated in FIG. 1, the user-defined source code 102 is input into a preprocessor module 104. The preprocessor module 104 optimizes the user-defined code with respect to organizing common resources referenced in the code in order to reduce the size of the binary code 116 produced by the compiler 110. The embodiment of FIG. 1 illustrates an example in which the user-defined source code 102 contains a number of modules denoted Module X, Module Y, and Module Z. Each module contains a number of source code listings, denoted SourceX, SourceY, and SourceZ, respectively. Each module can also include references to certain common resources, such as libraries, common functions, and so on. The preprocessor 104 acts as a logical tool that analyzes the user-defined source code 102 to determine the presence of common resources used by the different modules, and includes one or more sub-modules, such as sorter 106 and merger 108. The sorter 106 generally analyzes the source code files and common resources within each module and places them in a particular order for the compiler 110. The merger 108 discovers the presence of the same common resources within different modules and merges them so that only a single copy of a common resource is compiled regardless of the number of modules that call it. For the example of FIG. 1, each of the modules X, Y, and Z contains a separate copy of the "Common Resource." The preprocessor 104 discovers this duplicative code and merges the common resources so that the binary code 116 contains the binaries for the separate source code listings (SourceX, SourceY, and SourceZ), and only a single binary for the common resource, in a combined module denoted "Module XYZ" in binary code 116. In this manner, the original source code comprising separate modules is optimized with respect to the internal organization of common resources, subroutines, and so on. Without the preprocessor 104, compiler 110 would likely compile the code for modules X, Y, and Z as separate objects, resulting in three separate copies of the binary for the same common resource contained in the original source code listings.

Although preprocessor 104 is illustrated as a separate component to compiler 110 in the embodiment of FIG. 1, it should be understood that preprocessor 104 can also be a functional component within the compiler 110. The preprocessor 104 component can be implemented as a software program, a logic circuit, or any combination of software and hardware circuitry.

Figure 2:
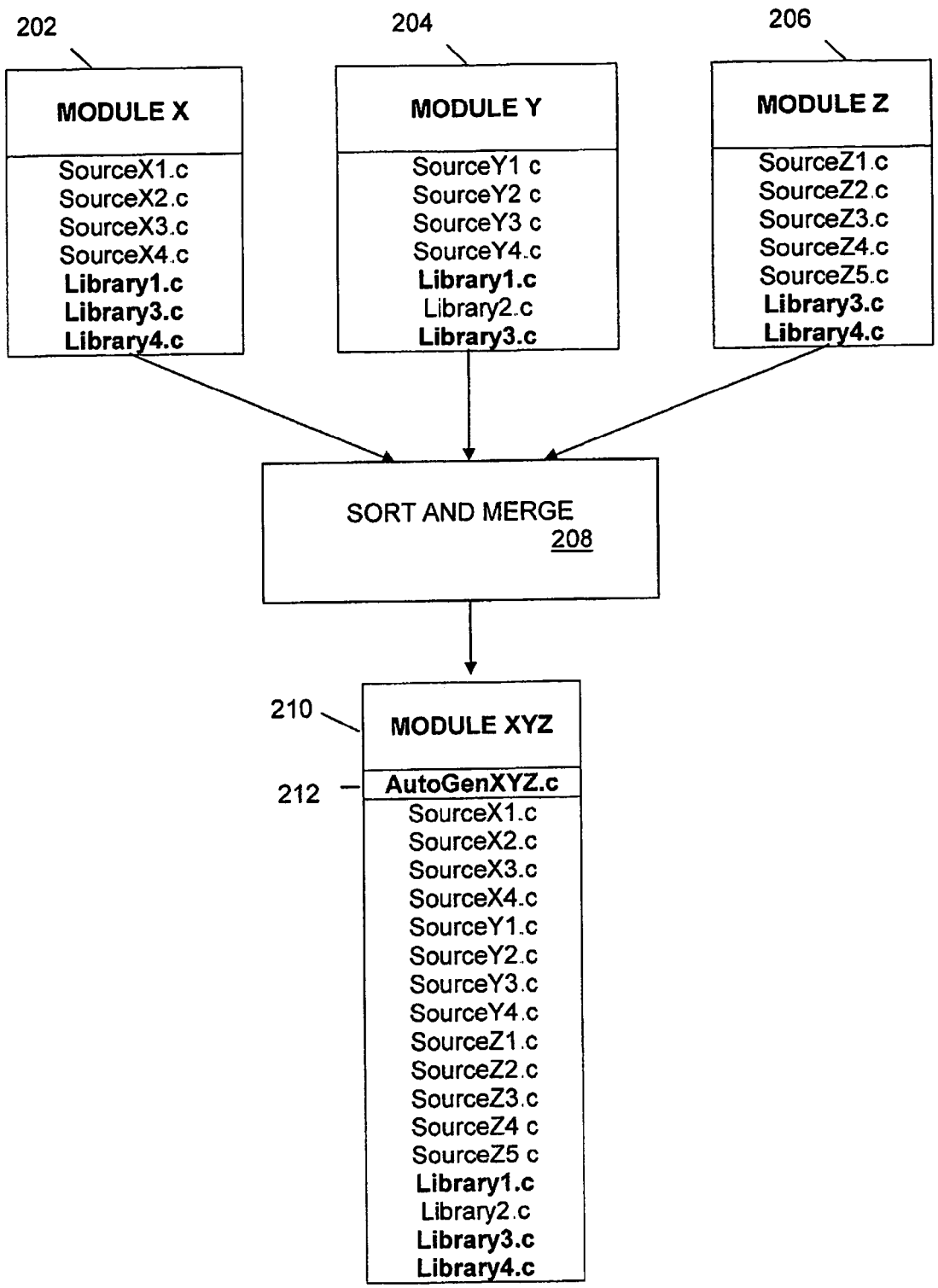
FIG. 2 illustrates the merging of separate program modules in a compiler preprocessing system, under an embodiment.

FIG. 2 illustrates the merging of separate program modules in a compiler preprocessing system, under an embodiment. For the example illustrated in FIG. 2, three program modules written in a high-level language (e.g., C), denoted Module X 202, Module Y 204, and Module Z 206 each contain a number of source listings and library files. The source listings are unique to each module. The library files, on the other hand, represent common resources that may be shared among two or more of the modules. As shown in FIG. 2, there are a total of four library files, denoted Library1.*c*, Library2.*c*, Library3.*c*, and Library4.*c*. Of these library files, Library1.*c*, Library3.*c*, and Library4.*c* are used by at least two or more of the modules.

In one embodiment, a sort and merge function 208 analyzes the three source code modules 202, 204, and 206, to determine dependencies or common use of the library files or similar common resources. For the example of FIG. 2, the sort and merge operation produces a combined or super module denoted Module XYZ 210, which contains all of the different source files, and only a single version of the used common resource files. In one embodiment, a dispatcher file, such as automatic module generator, AutoGen XYZ 212 automatically generates the combined module XYZ 210. Thus, as shown in FIG. 2, Module XYZ 210 includes the source files for each module, SourceXx.c+SourceYx.c+SourceZx.c, as well as the Library1.*c*, Library2.*c*, Library3.*c*, and Library4.*c* files.

In many cases, a firmware program may consist of a large number of different modules, many of which depend on one another or have some sort of relationship other modules. The sort and merge component 208 takes advantage of these possible relationships or dependencies by providing a mechanism of load ordering for the various modules. In one embodiment, the sorter function of the sort and merge component 208 groups candidate modules together, where the candidate modules represent modules that have a dependency or relationship with other modules. The dependencies may help to determine a particular logical order in which to load the modules. Thus, for example, if Modules X, Y, and Z all require Module M to be loaded first, the sorter loads Module X, Y, and Z as soon as Module M is available. The merge function of the sort and merge component 208 merges the X, Y, and Z modules together physically and calls them at the same time, as shown in FIG. 2.

In one embodiment, all of the merged modules are called with the same entry point. The grouped modules are merged by generating a simple dispatcher source file 212 to call each of the underlying entry routines and building all the modules together. As shown in FIG. 2, each of the modules, X, Y, and Z, which would normally be separate executables, are merged so that the subsequent compiler optimization features can be leveraged. If compiled separately, multiple copies of the library files Library1.*c*, Library3.*c*, and Library4.*c* would be compiled and stored. Through the sort and merge operation 208, only a single copy of each library file is compiled and stored.

For the embodiment illustrated in FIG. 2, dispatcher file 212 representing an initialization function is prepended to the merged binary to call each respective module's entry point and pass the normal image entry data. Pseudo-code illustrating an initialization function under an embodiment may be as follows:

```
EFI_STATUS
ModuleEntry(
        EFI_HANDLE          ImageHandle,
        EFI_SYSTEM_TABLE    SystemTable
    )
    {...}
    for (Count = 0; Count < EntryCount; EntryCount++) {
        CallModuleEntryPoint[Count] (ImageHandle, SystemTable);
    }
```

Ultimately, the originally disparate modules are sorted and merged into a single entity using a common dispatcher based on indicators that are selected to be used in the build process, but that were not necessarily or originally intended to be build directives. The sort and merge operations allow code that might be carried multiple times to be compiled only a single time, thus reducing the binary image size stored in memory.

For the embodiment illustrated in FIG. 2, a linker function (e.g., dispatcher 212) takes object files that are originally destined to be single target binaries and optimizes their references to common components. These common components may be purpose-built compile source components and library components that a given makefile forces an association with. Embodiments take different logical makefile targets (modules that have absolutely no relationship with one another), and using some dependency descriptions that are unique to the application (e.g., BIOS) or some other constraint, artificially create an association with these disparate modules and insert a dispatch mechanism to accomplish a seamless association. A deliverable may have different executable routines with different functions (e.g., a game, a kernel driver, a telnet daemon) that are normally built separately. Under normal circumstances there is no reasonable way to merge them together to leverage any level of optimizations, they either have different calling conventions or other limitations that make merging impractical. Embodiments take a mechanism of association that is unique and insert code to leverage such an association so that each module can in turn be dispatched correctly, with the net result being an optimization in size, and ultimately in speed. The system creates an artificial association of unrelated components and inserts code to make the components execute correctly.

The combined module XYZ 210 is input to a compiler, e.g., compiler 110 in FIG. 1, to produce the compiled binary code, e.g., binary code 116. In one embodiment, the compiled binary code comprises a COFF (Common Object File Format) header, a PE (Portable Executable) header, a number of section headers, and the image content.

Figure 3:
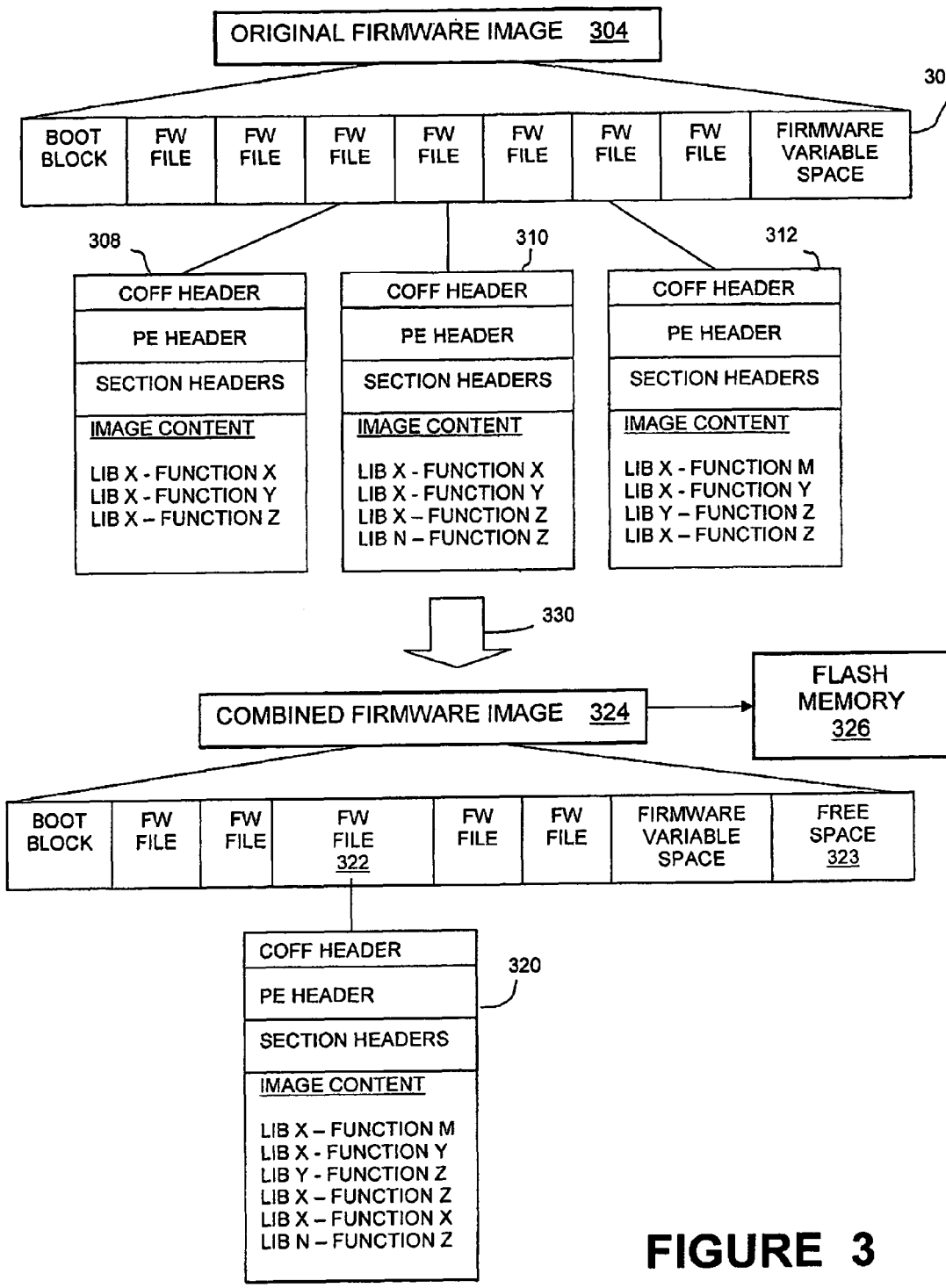
FIG. 3 illustrates the generation of a combined compiled binary code using a compiler preprocessing system, according to embodiments.

FIG. 3 illustrates the generation of a combined compiled binary for a firmware program using a compiler preprocessor, according to one or more embodiments. As shown in FIG. 3, an original firmware image 304 is made up of a number of firmware files in a firmware variable space 306. Each separate firmware file comprises a COFF header, a PE header, section headers, and image content that may include library files for specific functions. For the example illustrated in FIG. 3, the structure and content of three separate firmware file modules 308, 310, and 312 are shown in detail. For this example, the LibraryX-FunctionX object is contained in both module 308 and 310, the LibraryX-FunctionY object is contained in all three modules, as is LibraryX-FunctionZ. The presence of these repeated libraries establishes a relationship among the modules that is exploited by the compiler preprocessor 104. The sort function 106 determines the order in which the modules are called, and the merge function 108 builds the combined module. Thus, as shown in FIG. 3, using the compiler preprocessor 104 through process 330, the separate modules 308, 310, and 312 are merged to produce a combined module 320. This module includes a single copy of all of the library functions used by the separate modules. The combined module represents a single firmware file 322 within the combined firmware image 324, which is stored as compiled combined binary code in Flash (or similar) memory 326. The merging of the commonly used resource files results in free space 323 within the entire firmware space, compared with the original firmware image 304.

As described above, embodiments of a compiler preprocessor exploit a mechanism of association that is unique to originally disparate modules to provide a basis for merging the modules and eliminating redundant compilation and storage of commonly used resources. In one embodiment, the original separate modules may contain one or more dependency expressions that are defined by the firmware components and/or the source code language. Dependency expressions define specific dependencies of the modules in relation to one another. A dependency expression can be any type of expression within a firmware file that indicates a link or relationship with any other firmware file, or that basically indicates to the compiler that the module depends on a certain component or object (e.g., a library file). Files with some relationship can therefore be linked by including the same dependency expression. For example, a number of files, each with their own entry points (ModuleXEntry) may have dependency expressions of the form DepexA, DepexB, DepexC, . . . , DepexN. If any two or more files have the same dependency expression, e.g., DepexA, they can then be merged on the basis of their common resource or aspect. Thus, the expression "DepexA" may indicate that any module that contains this expression depends on a particular library file, such as Library1.c. Through the use and exploitation of dependency expressions, singleton firmware modules can be merged without extensive, or in some cases, any code modifications. The merging operation can be performed automatically during the build process of the executable module. The build process can be configured to provide an inserted segment of code that can allow for more efficient merging of code across binary boundaries to accomplish a reduction in the overall binary sizes.

Figure 4:
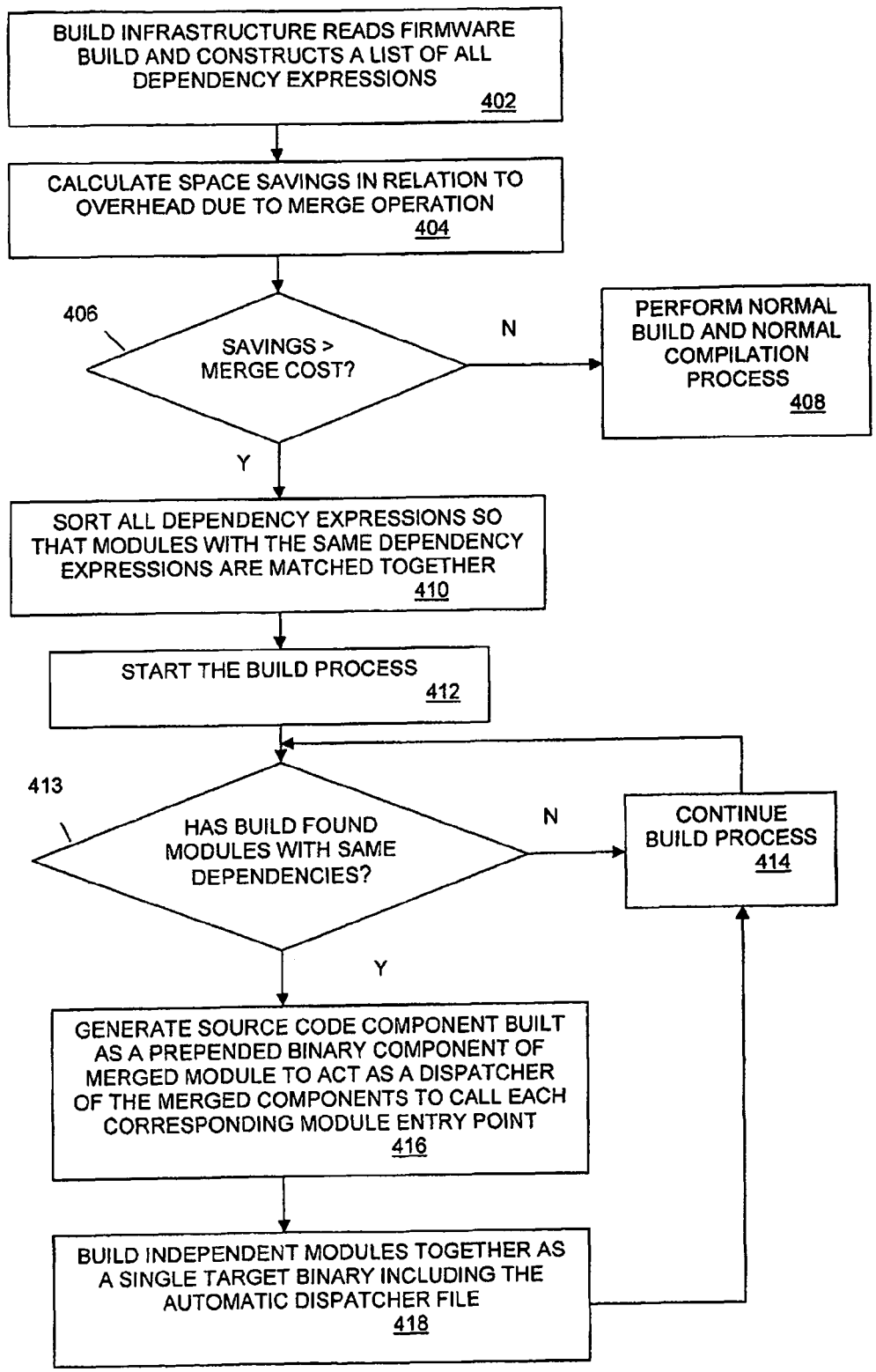
FIG. 4 is a flow diagram that illustrates a method of building a combined binary image of firmware using dependency expressions, according to an embodiment.

FIG. 4 is a flow diagram that illustrates a method of building a combined binary image of firmware using dependency expressions, according to an embodiment in which dependency expressions are used. As shown in FIG. 4, the general process starts with the build process reading the firmware build and constructing a list of all dependency expressions, block 402. In certain cases, there may not be enough dependency among the modules to justify merging the modules relative to compiling the modules separately. Thus, in block 404, the process calculates the value of the space savings in memory relative to the processing overhead added by the sort/merge functions of the compiler preprocessor component. In some cases, such as with the use of dependency expressions, the additional overhead may be minimal. In other cases, some code may need to be added to condition the modules in order to determine the dependencies. If, in block 406, it is determined that the value of the space savings does not exceed the cost of merging the modules, the process performs a normal build and compilation of the modules, block 408. If, however, in block 406 it is determined that the value of the space savings is worthwhile, the sorter function sorts all dependency expressions so that modules with the same dependency expressions are matched, block 410.

In block 412 the build process is initiated. In block 413 the process determines whether modules with the same dependencies have been found. If not, the process continues the build process, block 414. When modules with the same dependencies are found, the process generates a source code component built as a prepended binary component of the merged module, block 416. This component is a dispatcher that calls each corresponding module entry point. As shown in block 418, the independent modules are built together as a single target binary that also includes the automatic dispatcher file. The process then continues until all modules with some dependency to other modules are merged with those modules. The merged binary code is then stored in the appropriate memory device.

Figure 5:
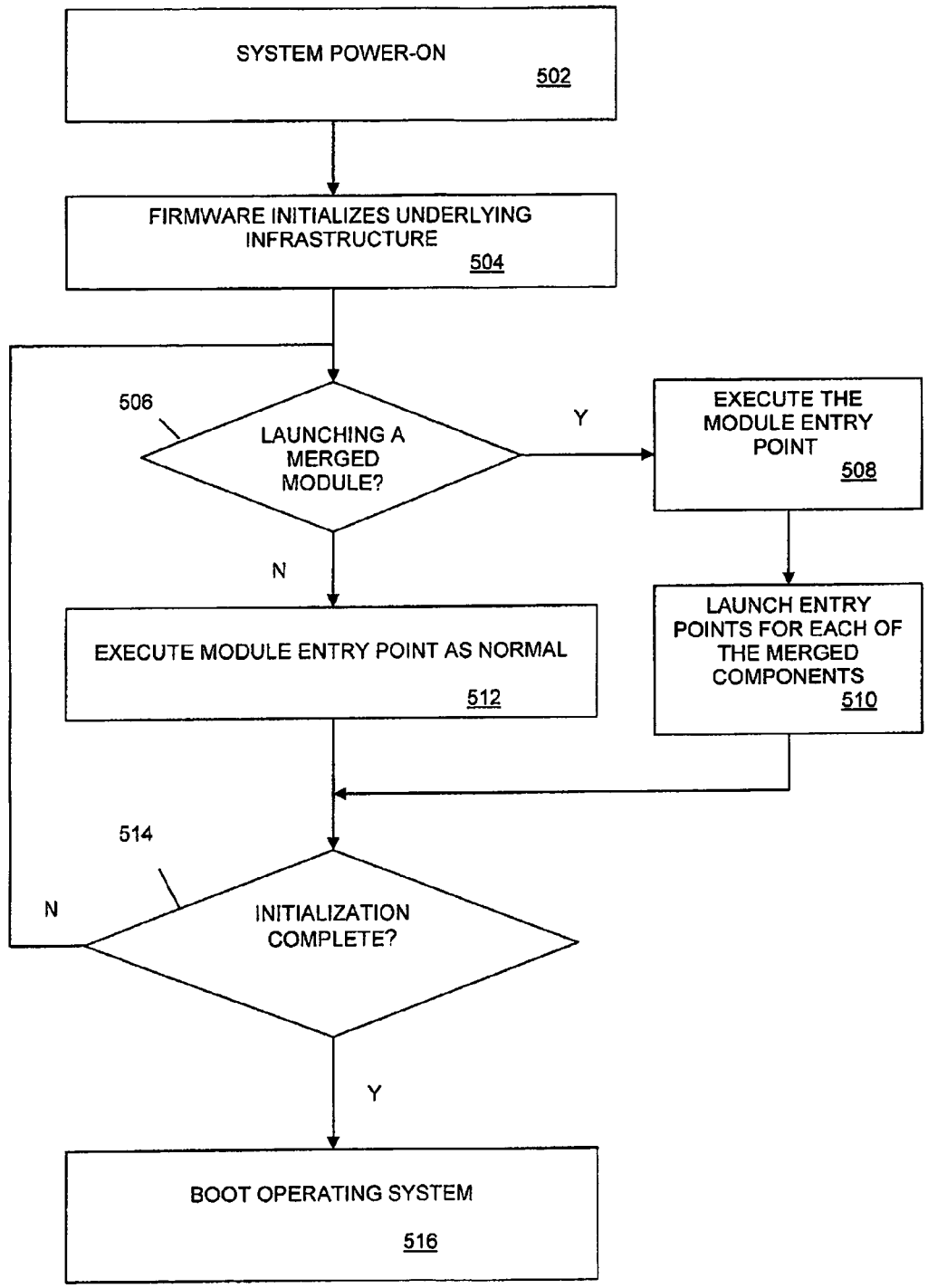
FIG. 5 is a flow diagram that illustrates a method of launching a combined binary image of firmware upon boot-up, under an embodiment.

FIG. 5 is a flow diagram that illustrates a method of launching a combined binary image of firmware upon system boot-up, under an embodiment. Upon system power-on in block 502, the firmware initializes the underlying infrastructure (e.g., hardware circuits, and software), block 504. In block 506, the process determines whether it is launching a merged module. If it is not a merged module, the module entry point is executed as normal, block 512. If a merged module is being launched, the process executes the module entry point, block 508. It then launches the entry points for each of the merged components, block 510. In block 514, it is determined whether or not initialization is complete. If so, the operating system is booted, block 516, otherwise the initialization process continues with the next module and determines whether the next module is a merged module that is being launched, block 506; after which the process continues as shown in the remainder of the flow diagram until it is determined in block 514 that initialization is complete.

Embodiments of a compiler preprocessor, as described, provide a means by which pre-existing firmware codebases can be used to generate an optimized firmware image, which has been seamlessly reduced in size. This space savings is additive to the normal compression that one might otherwise do as a normal part of the firmware image construction phase. The use of a compiler preprocessor also provides the benefits of materially reducing the size of the modules even in XIP (execute-in-place) regions, which are typically not capable of being compressed. Embodiments of the code construction mechanisms which accomplish this Flash image build optimization can occur during the build phase of the firmware image construction, with the end-result usually being detectable by analysis of the binary code.

Although the present embodiments have been described in connection with a preferred form of practicing them and modifications thereto, those of ordinary skill in the art will understand that many other modifications can be made within the scope of the claims that follow. Accordingly, it is not intended that the scope of the described embodiments in any way be limited by the above description, but instead be determined entirely by reference to the claims that follow.

For example, embodiments can be implemented for use on a variety of different multiprocessing systems using different types of CPUs. Furthermore, although embodiments have been described in relations to compilers and code generators for translating high level language programs to target binary code, it should be understood that aspects can apply to any type of language translator that generates target code for execution on any type of computer system or computing device.

For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, digital signal processors, and micro-controllers, etc.

The memory associated with the system illustrated in FIG. 1, may be embodied in a variety of different types of memory devices adapted to store digital information, such as static random access memory (SRAM), dynamic random access memory (DRAM), synchronous dynamic random access memory (SDRAM), and/or double data rate (DDR) SDRAM or DRAM, and also non-volatile memory such as read-only memory (ROM). Moreover, the memory devices may further include other storage devices such as hard disk drives, floppy disk drives, optical disk drives, etc., and appropriate interfaces. The system may include suitable interfaces to interface with I/O devices such as disk drives, monitors, keypads, a modem, a printer, or any other type of suitable I/O devices.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

While the term "component" is generally used herein, it is understood that "component" includes circuitry, components, modules, and/or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. Accordingly, the inventors reserve the right to add additional claims after filing the application to pursue such additional claim forms for other aspects as well.

What is claimed is:

1. A computer-implemented method of optimizing object code modules, comprising:

analyzing a plurality of program modules written in a high-level language, each program module having a unique entry point and including one or more source code files and common resource objects based on dependence on identical common resource objects, to detect repetition of common resource objects in different program modules of the plurality of program modules;

merging the plurality of program modules into a single program module written in the high-level language containing a copy of the source code files of each program module and a single copy of common resource object unique to each module, and a single copy of the common resource objects shared by two or more program modules of the plurality of program modules;

generating a single entry point for the single program module; and inserting into the single program module a dispatcher file to call to all of the copies of the source code files and common resource objects contained in the single program module using the single entry point.

2. The method of claim 1, wherein each program module of the plurality of program modules includes a dependency expression, the method further comprising:

constructing a list of all dependency expressions, each dependency expression referencing a particular common resource object;

sorting the plurality of modules so that modules with the same dependency expressions are grouped together;

detecting the presence of repeated dependency expressions within two or more program modules; and generating, for the single program module, a single copy of a common resource object referenced by the repeated dependency expressions.

3. The method of claim 1, wherein each of the plurality of program modules and single program module are written in a high-level computer language, the method further comprising transforming the single program module from the high-level language to a binary object code module for storage in a memory of a computer system.

4. The method of claim 3, wherein the binary object code module is generated by a compiler transforming the high-level program code to the binary object code.

5. The method of claim 4, wherein the common resources are selected from a group consisting of library files, driver files, input/output routines, and hardware resources.

6. The method of claim 5, wherein the memory comprises Flash memory, and wherein the binary object code module comprises a firmware program executed by the computer system.

7. A system comprising:

a memory device to store a plurality of high-level language modules;

a compiler preprocessor including a sorter component to sort the plurality of high-level language modules each containing source code files and common resource objects based on dependence on identical common resource objects to detect repetition of common resource objects;

a merger component to merge the plurality of modules into a single high-level language module containing a copy of the source code files of each program module, a single copy of common resource objects unique to each module, and a single copy of the common resource objects depended upon by any two or more of the plurality of objects; and a processing unit to execute a compiler functionally coupled to the compiler preprocessor to transform the single high-level language module from the high-level language to a binary object code module for storage in the memory device, wherein the compiler preprocessor generates a single entry point for the single high-level language module, and inserts into the single program module a dispatcher file to call to all of the copies of the source code files and common resource objects contained in the single high-level language module using the single entry point.

8. The system of claim 7, wherein each program module of the plurality of high-level program modules includes a dependency expression, the compiler preprocessor further configured to:

construct a list of all dependency expressions, each dependency expression referencing a particular common resource object;

sort the plurality of modules so that modules with the same dependency expressions are grouped together;

detect the presence of repeated dependency expressions within two or more program modules; and generate, for the single program module, a single copy of a common resource object referenced by the repeated dependency expressions.

9. The system of claim 7, wherein the common resource objects are selected from a group consisting of library files, driver files, input/output routines, and hardware resources.

10. The system of claim 9, wherein the memory comprises Flash memory, and wherein the binary object code module comprises a firmware program executed by the computer system.

11. The system of claim 10, wherein the high-level language is selected from the group consisting of: the FORTRAN programming language, the C programming language, the C++ programming language, and the Java™ programming language.

12. A machine-readable storage medium having a plurality of instructions stored thereon that, when executed by a processor in a system, performs the operations of:

analyzing a plurality of program modules written in a high-level language, each program module having a unique entry point and including one or more source code files and common resource objects, to detect repetition of common resource objects based on dependence on identical common resource objects in different program modules of the plurality of program modules;

merging the plurality of program modules into a single program module written in the high-level language and containing a copy of the source code files of each program and a single copy of common resource object unique to each module, and a single copy of the common resource objects shared by two or more program modules of the plurality of program modules;

generating a single entry point for the single program module; and inserting into the single program module a dispatcher file to call to all of the copies of the source code files and common resource objects contained in the single program module using the single entry point.

13. The machine-readable storage medium of claim 12, further comprising instructions that perform the operations of:

constructing a list of all dependency expressions, each dependency expression referencing a particular common resource object;

sorting the plurality of modules so that modules with the same dependency expressions are grouped together;

detecting the presence of repeated dependency expressions within two or more program modules; and generating, for the single program module, a single copy of a common resource object referenced by the repeated dependency expressions.

* * * * *